(12) United States Patent
Pezzimenti

(10) Patent No.: US 9,096,017 B2
(45) Date of Patent: Aug. 4, 2015

(54) FABRIC WELDING AND CUTTING WHEEL ASSEMBLY

(75) Inventor: Luke A. Pezzimenti, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 684 days.

(21) Appl. No.: 13/449,725

(22) Filed: Apr. 18, 2012

(65) Prior Publication Data

US 2013/0277349 A1    Oct. 24, 2013

(51) Int. Cl.
| | | |
|---|---|---|
| *B32B 37/00* | (2006.01) | |
| *B29C 65/00* | (2006.01) | |
| *A41D 27/24* | (2006.01) | |
| *B29C 65/18* | (2006.01) | |
| *B29C 65/50* | (2006.01) | |
| *B29C 65/74* | (2006.01) | |
| *D06H 5/00* | (2006.01) | |
| *B29C 65/48* | (2006.01) | |
| *B29L 31/48* | (2006.01) | |
| *B29C 65/08* | (2006.01) | |

(52) U.S. Cl.
CPC ........ *B29C 66/83413* (2013.01); *A41D 27/245* (2013.01); *B29C 65/087* (2013.01); *B29C 65/18* (2013.01); *B29C 65/4815* (2013.01); *B29C 65/5057* (2013.01); *B29C 65/7435* (2013.01); *B29C 65/7437* (2013.01); *B29C 65/7443* (2013.01); *B29C 66/1122* (2013.01); *B29C 66/21* (2013.01); *B29C 66/43* (2013.01); *B29C 66/729* (2013.01); *B29C 66/81429* (2013.01); *B29C 66/81431* (2013.01); *B29C 66/81433* (2013.01); *B29C 66/83411* (2013.01); *D06H 5/00* (2013.01); *B29C 65/081* (2013.01); *B29L 2031/485* (2013.01)

(58) Field of Classification Search
CPC .. B29C 65/08; B29C 65/087; B29C 65/7435; B29C 65/7437; B29C 65/7443; B29C 66/1122; B29C 66/21; B29C 66/43; B29C 66/729; B29C 66/81429; B29C 66/81433; B29C 66/83411; B29C 66/83413
USPC ............... 156/73.1, 73.3, 252, 253, 510, 515, 156/530, 580.1, 580.2
See application file for complete search history.

(56) References Cited

U.S. PATENT DOCUMENTS

| | | |
|---|---|---|
| 3,115,564 A | 12/1963 | Stacy |
| 3,852,144 A | 12/1974 | Parry |
| 4,259,399 A | 3/1981 | Hill |
| 4,496,407 A | 1/1985 | Lowery |
| 4,560,427 A | 12/1985 | Flood |
| 4,610,750 A | 9/1986 | Mango |

(Continued)

OTHER PUBLICATIONS

International Search Report and Written Opinion of Aug. 9, 2013 for PCT/US2013/037191 filed Apr. 18, 2013.

*Primary Examiner* — James Sells
(74) *Attorney, Agent, or Firm* — Shook, Hardy & Bacon L.L.P.

(57) ABSTRACT

A welding and cutting wheel for permanently bonding microdenier fabrics is provided. The wheel assembly comprises a first rotatable wheel equipped with a plurality of spikes along its perimeter, the first rotatable wheel being positioned to rotate around a first axis, a second rotatable wheel equipped with a plurality of holes along its planar face, the second rotatable wheel being positioned to rotate around a second non parallel axis in relation to the first axis, and an energy source operably connected to at least one of the rotatable wheels, to activate an adhesive material used in the bonding process.

22 Claims, 7 Drawing Sheets

(56) References Cited

U.S. PATENT DOCUMENTS

| | | |
|---|---|---|
| 4,686,136 A * | 8/1987 | Homonoff et al. ............ 442/247 |
| 4,693,771 A | 9/1987 | Payet |
| 4,713,131 A | 12/1987 | Obeda |
| 4,938,817 A | 7/1990 | Langley |
| 5,500,247 A | 3/1996 | Hagqvist |
| 5,665,196 A | 9/1997 | Combe |
| 5,727,458 A | 3/1998 | Schulz |
| 6,805,181 B2 | 10/2004 | Blundell |
| 7,323,072 B2 | 1/2008 | Engelhart |
| 2006/0087053 A1 | 4/2006 | O'Donnell |

* cited by examiner

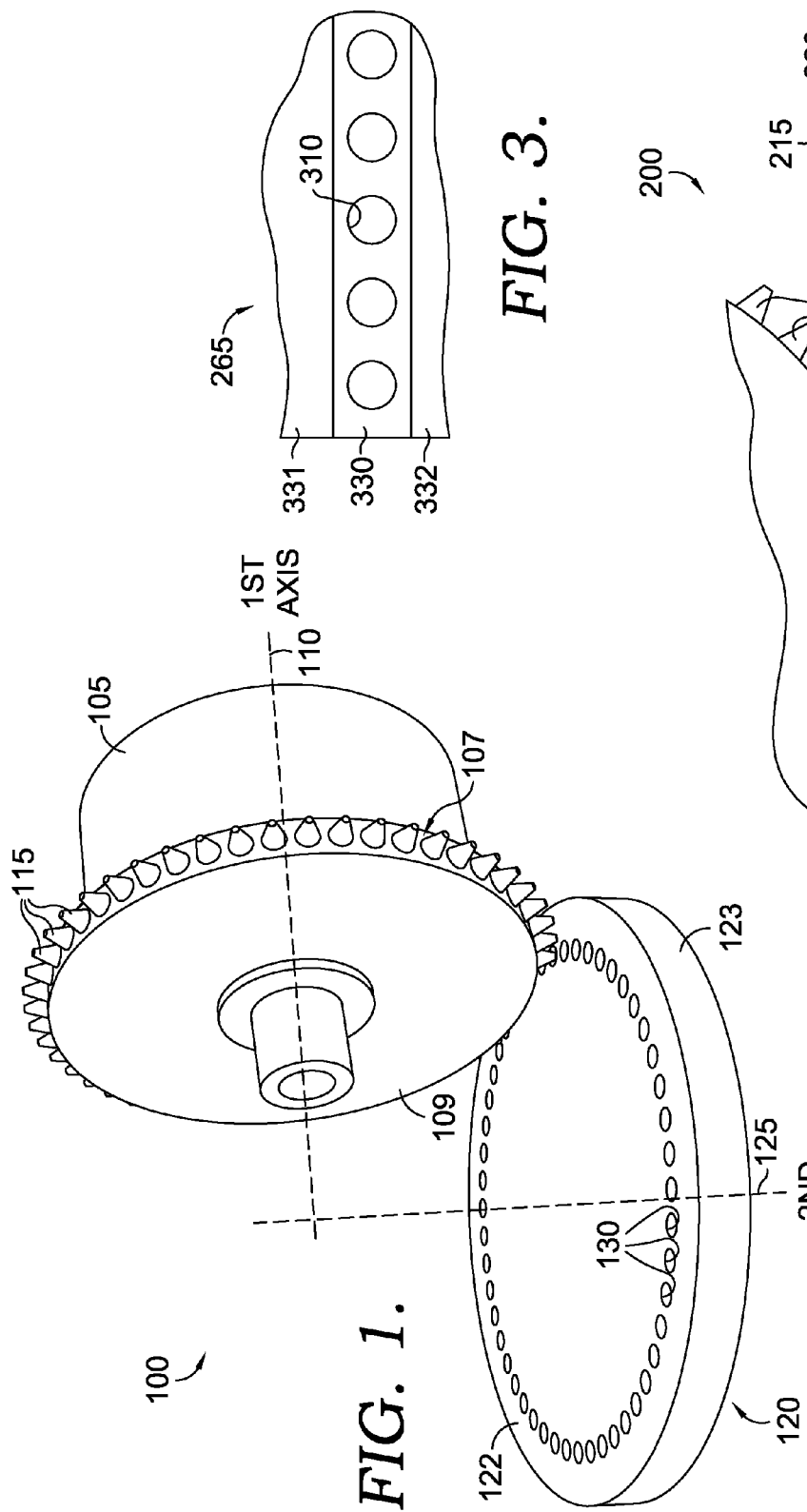

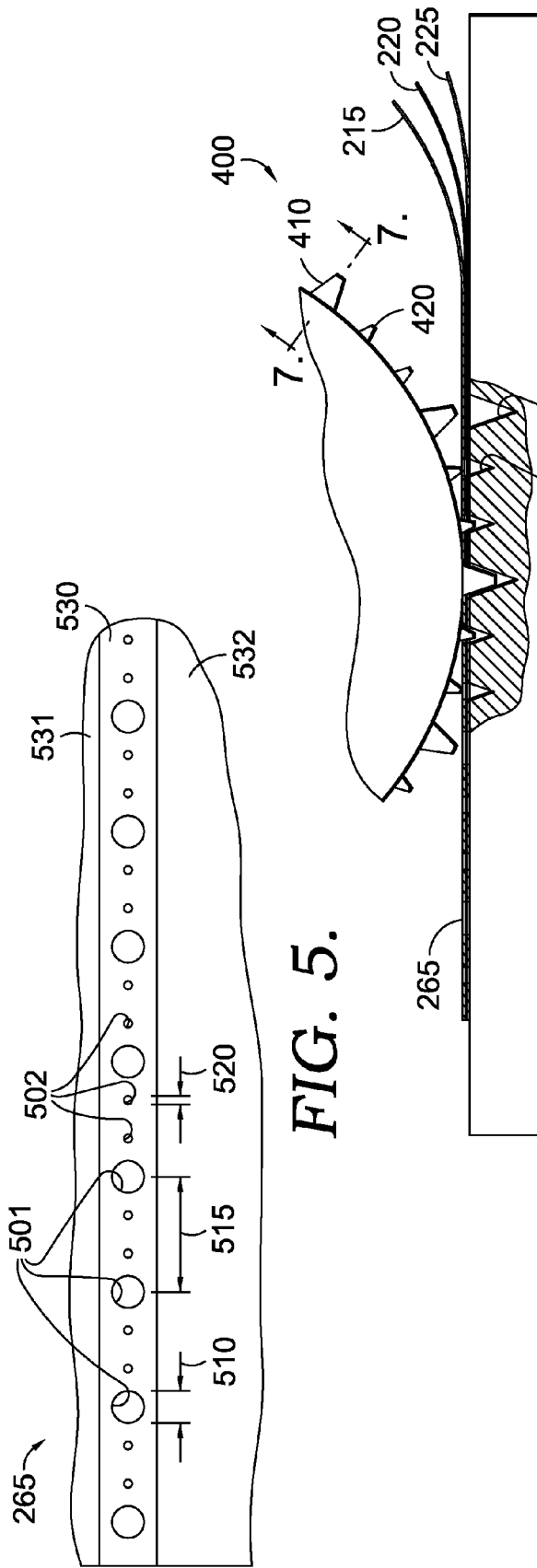
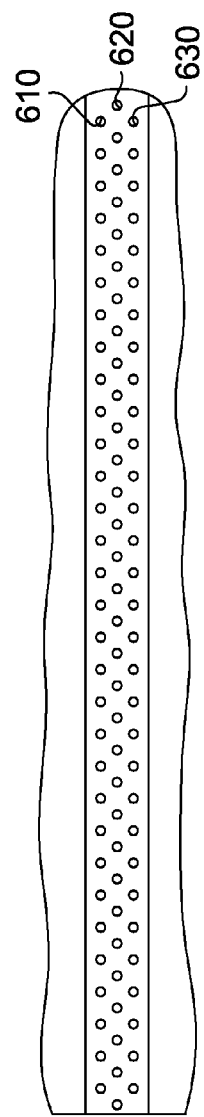

FABRIC WELDING AND CUTTING WHEEL ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to stitchless bonding of fabrics. More particularly, the present invention relates to the stitchless bonding of fabrics while simultaneously forming indentations or perforations in the fabric to strengthen the bond. The bonds formed by the present invention may also present a pleasing appearance, and/or may also provide other functional benefits such as improved ventilation.

BACKGROUND

Micro-denier fabrics are widely used in constructing clothing. The bonding of these micro-denier fabrics is a common step used in the fabrication of garments or other items made from micro-denier fabrics. Making durable bonds of micro-denier fabrics is problematic because micro-denier fabrics may become very slick and slippery following chemical treatment with different kinds of coatings to make them water resistant, down resistant and/or tear resistant. These treatments may comprise silicone or acrylic coatings usually referred to as DWR (durable water repellent).

In addition to the problem described above, making perforations on bonded fabric layers may be a long, costly and/or labor intensive process. For example, perforations may be made with laser cutters, which may not be desirable because, in addition to being costly and labor intensive, they may char the fabric. A typical mechanical cutting wheel (such as those used for embossing) may be used, but requires an adhesive backing paper be attached to one side of the fabric assembly, because this type of mechanical wheel presses a cutting edge to a flat surface, they do not cut and/or perforate completely through the fabric. Therefore, after the fabric assembly is cut with this type of mechanical wheel, the perforations may be formed by peeling off the adhesive backing paper, which also peels off the residual cutout fabric remains adhering to the backing paper.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present invention provides a mechanical welding and cutting wheel that simultaneously welds and perforates fabric assemblies in a well controlled fashion without the risk of charring the fabrics and without the need for using extra materials such as the adhesive backing paper. The present invention permits a reduction of waste during the perforation of layered textiles, as no adhesive backing material is needed to remove cut portions to form an open perforation. Further, the construction process may be simplified by performing welding and perforation operations in a single step.

Hereinafter, the word "welding" will be used to refer to the process of joining two or more fabrics together. In addition, "adhesive welding" will be used to particularly point out the presence of a tape, film or glue material as the bonding component between two or more fabrics in accordance with the present invention.

Examples of the present invention relate to a wheel assembly that permanently welds and cuts two or more pieces of fabric, methods for using such an assembly, and garments, bags, and other fabric items formed using such assemblies and methods. In one example of the present invention, the wheel assembly comprises a pair of rotatable wheels. Each wheel may comprise a plurality of spikes and/or a plurality of holes. The plurality of holes from the second wheel may be configured to precisely receive the plurality of spikes from the first wheel, and vice versa, wherein the first rotatable wheel may be configured to rotate around a first axis and the second rotatable wheel that may be configured to rotate around a second axis, the second axis being oriented at an angle from the first axis. Also, the wheel assembly may be operably coupled to an energy source that can activate an adhesive material, such as a heat or ultrasonically activated tape or film, placed in between the fabric layers in the welding process.

In another example in accordance with the present invention, the wheel assembly comprises a male rotatable wheel that may rotate around a first axis and a female rotatable wheel that may rotate around a second axis, the second axis being oriented at an angle from the first axis. The male rotatable wheel may be equipped with a plurality of spikes and/or other protrusions along its perimeter, and the female rotatable wheel may be equipped with a plurality of holes and/or other indentations along its planar face, configured to precisely receive the plurality of spikes from the first male rotatable wheel as the wheels are rotated. The wheel assembly may also be operably coupled to an energy source that can activate an adhesive welding material, such as a heat or ultrasonically activated tape or film, placed in between the fabrics.

In another example of the present invention, the wheel assembly comprises a female rotatable wheel that may rotate around a first axis and a male rotatable wheel that may rotate around a second axis, the second axis being oriented at an angle from the first axis. The male rotatable wheel may be equipped with a plurality of spikes and/or other protrusions along its planar face, and the female rotatable wheel may be equipped with a plurality of holes and/or other indentations along its perimeter configured to precisely receive the plurality of spikes from the male rotatable wheel as the wheels are rotated. The wheel assembly may also be operably coupled to an energy source that can activate an adhesive welding material, such as a heat or ultrasonically activated tape or film, placed in between the fabrics.

In an additional example of the present invention, the wheel assembly comprises a male rotatable wheel that may rotate around a first axis and a female rotatable wheel that may rotate around a second axis, the second axis being oriented at an angle from the first axis. The male rotatable wheel may be equipped with a plurality of spikes and/or other protrusions along its perimeter, and the female rotatable wheel may be equipped with a plurality of holes and/or other indentations also along its perimeter configured to precisely receive the plurality of spikes from the male rotatable wheel as the wheels are rotated. The wheel assembly may also be operably coupled to an energy source that can activate an adhesive welding material, such as a heat or ultrasonically activated tape or film that may be placed in between the fabrics to be welded.

Further, the wheel assemblies described above may further comprise an automatic adhesive tape delivery system that inserts an adhesive tape between layers of fabric as the layers of fabric pass between the rotatable wheels.

Additionally, the welding and cutting wheel in accordance with the present invention, may be used to weld and cut different types of woven or non-woven pliable sheet-type materials. Depending on the nature of the pliable sheet-type material used, an adhesive layer may or may not be necessary to weld and cut two or more pieces of pliable sheet-type materials. For example, plastic pliable sheet-type materials may be welded by the simple application of heat energy. Further, the two or more pliable sheet-type materials to be welded and cut may be of the same type, or may be of different types.

In accordance with the present invention, when at least two pieces of pliable sheet-type material become permanently welded and cut simultaneously, the holes thereby cut may strengthen the bond between the fabric layers, provide ventilation, and/or even provide a pleasing appearance to the assembled fabric.

BRIEF DESCRIPTION OF THE DRAWINGS

The present invention is described in detail below with reference to the attached drawing figures, wherein:

FIG. 1 is a perspective view of an exemplary welding and cutting wheel assembly in accordance with the present invention;

FIG. 2 is a view of an exemplary welding and cutting wheel in accordance with the present invention as it is being used to weld and cut a fabric and adhesive assembly;

FIG. 3 is a view of an exemplary fabric and adhesive assembly after welding and cutting has taken place with the welding and cutting wheel presented in FIG. 2 in accordance with the present invention;

FIG. 4 is a view of another exemplary cutting and welding wheel in accordance with the present invention as it is being used to weld and cut a fabric and adhesive assembly;

FIG. 5 is a view of an exemplary fabric and adhesive assembly after welding and cutting has taken place with the welding and cutting wheel presented in FIG. 4 in accordance with the present invention;

FIG. 6 is a view of a different exemplary fabric and adhesive assembly after welding and cutting has taken place with the welding and cutting wheel in accordance with the present invention;

DETAILED DESCRIPTION

Figure 7:
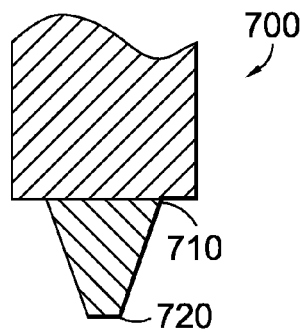
FIG. 7 is a cross-section of a different exemplary flat cone spike of the cutting and welding wheel in accordance with the present invention.

Fabrics can be bonded together either by stitching or gluing using adhesives. In the case of micro-denier fabrics, stitching, particularly used without an adhesive, may be undesirable because holes may be poked into the fabrics, which may undermine the water repellent properties of these fabrics. Also, stitching without an adhesive may lead to ripping due to the light weight nature of micro-denier fabrics. Micro-denier fabrics tend to be lighter than other types of fabrics. For example, fabrics may be classified as ultra-light (which may range from 29 g/m$^2$ and lower), lightweight (which may range between 30-89 g/m$^2$), mid-weight (which may range between 90-149 g/m$^2$), and heavyweight (which may range in 150 g/m$^2$ and higher). Gluing ultra-light and/or light micro-denier fabrics to make durable bonds may be challenging and problematic because micro-denier fabrics may become very slick and slippery following treatment with different kinds of coatings comprising silicone or acrylic, commonly referred to as DWR (durable water repellent), although any weight or type of fabric/textile may present similar challenges. Treatment with DWR is often necessary to make the micro-denier fabrics more water resistant, down resistant and/or tear resistant, since it tends to toughen these types of fabrics or textiles. The welding and cutting wheel assembly of the present invention is well suited for bonding and perforating DWR treated fabrics, but may be used in conjunction with any other type of fabrics or textiles of any weight, fiber type, and/or construction.

In accordance with the present invention, a welding and cutting wheel assembly for permanently bonding fabrics by overcoming the challenges described above is provided. The wheel assembly of the present invention uses a bonding mechanism by essentially adhesive welding two or more fabrics together in three dimensions. The wheel assembly of the present invention may utilize a user-friendly overlock system. As a fabric assembly comprising at least two layers of fabric and an interspersed adhesive is moved along and pushed in between the wheels of the wheel assembly of the present invention, a permanent seam is created in a portion that is less than the entirety of the length of the fabric assembly by applying heat or ultrasonic energy to activate the adhesive tape. As one or more of the wheels apply energy to activate the adhesive, combinations of spikes and holes on the wheels themselves puncture the fabric assembly as a seam is formed at the pressure points created in between the spikes and holes when the wheels mate.

It should be noted that the word "spikes" used herein is intended to include protrusions, jabs, pecks, spears, spikes, or any other puncturing object, and the word "holes" used herein is intended to include indentations, aperture, orifice, perforation, cavity, or any other type of opening. In addition to being permanent, another advantage of the seams made by the wheel assembly of the present invention is that they can be used externally to create visually appealing effects such as logos or designs, and/or to create a two-way airflow between the interior and the exterior of the finalized articles of manufacture.

Referring now to FIG. 1, a wheel assembly 100 capable of welding and cutting two or more pieces of fabric simultaneously by the mating action of the wheels is shown. The wheel assembly 100 comprises an energy source (not shown), such as heat or ultrasonic energy, to activate the adhesive material used for the bonding of the fabrics to create a permanent seam (not shown), a first rotatable male wheel 105 positioned to rotate around a first axis 110, and a second rotatable female wheel 120 positioned to rotate around a second axis 125. The male rotatable wheel 105 having a planar face 109 and a perimeter 107, is equipped with a plurality of spikes 115 along its perimeter 107. The rotatable female wheel 120 having a planar face 122 and a perimeter 123, is equipped with a plurality of holes 130 on its planar face 122. The plurality of holes 130 of the rotatable female wheel are configured to receive the plurality of spikes 115 from the rotatable male wheel 105 as the wheels in the wheel assembly 100 of the present invention are simultaneously rotated.

Alternatively, the wheel assembly of the present invention may comprise two hermaphrodite wheels wherein the first wheel may be equipped with both a plurality of spikes and a plurality of holes, arranged according to the user's need, along its perimeter, the first wheel being positioned to rotate around a first axis. The second wheel of this alternate example wheel assembly of the present invention may also be equipped with a plurality of spikes and a plurality of holes along its planar face configured to precisely mate with the plurality of holes and spikes of the first wheel, as the wheels are simultaneously rotated, the second wheel being positioned to rotate around a second axis, such that the first axis is not parallel to the second axis.

A working wheel assembly in accordance with the present invention is depicted in FIG. 2. A fabric assembly comprising a first fabric layer 215, an adhesive layer 220 and a second fabric layer 225 may be run through and between the male wheel and female wheel. As the fabric assembly passes through the wheel assembly, the adhesive tape becomes activated by heat or ultrasonic energy, thereby welding the fabrics together by pushing the first fabric layer 215, the adhesive layer 220 and the second fabric layer 225 together at the area 240 where the two wheels are in close contact. At this point, there may be extra pressure applied, however this extra pressure is not necessary for the welding process. At the area where all components of the fabric assembly come in close contact with each other, the plurality of spikes 115 of the rotatable male wheel simultaneously cut holes through the bonded fabric assembly 265 by essentially pushing their way through the fabric assembly. During the welding and cutting process of the fabric assembly 265 with the wheels in accordance with the present invention, the spikes 115 of the rotatable male wheel are received by the holes 130 of the rotatable female wheel.

FIG. 3 illustrates an example seam 330 created on the bonded fabric assembly 265 by the wheel assembly 100 of the present invention. As seen in FIG. 3, the seam 330 has holes 310 cut through the fabric assembly 265. In this example, loose fabric is shown above 331 and below 332 the seam to represent a seam that may go in the middle of the finalized article of manufacture. However, it can be readily seen that these types of seams may also be used as hem or terminal seams, such as those as subsequently shown in the example presented in FIG. 12.

The holes cut in the seams produced with the wheel assembly in accordance with the present invention may be of different shapes and sizes and may be presented in different patterns. For example, FIG. 4 illustrates a welding and cutting wheel assembly 400 in accordance with the present invention that has different sets of spikes as those presented in the welding and cutting wheel assembly 200 of FIG. 2. The male rotatable wheel of the welding and cutting wheel assembly 400 of FIG. 4 has a set of big spikes 410 and a set of small spikes 420 arranged on the perimeter of the rotatable male wheel. Correspondingly, the rotatable female wheel has big holes 430 and small holes 440. The spikes on the perimeter of the rotatable male wheel are arranged such that two small spikes 420 are evenly spaced and placed in between two big spikes 410. The pattern formed by the holes cut into a fabric assembly 265, by the welding and cutting wheel assembly 400 shown in FIG. 4 in accordance with the present invention is shown in FIG. 5.

FIG. 5 illustrates a further example of a seam 530 with loose fabric above 531 and below 532, that can be created with the wheel assembly of the present invention. In this example, a seam with the holes of differing sizes arranged in a specific pattern is depicted, but the present invention is not limited to any particular pattern. There is a first group of holes 501 having a first diameter 510 (for example, about 2 mm, or in a range from 0.5 mm-5 mm, or any other size suitable for the end use) and being a first distance 515 apart, measuring from the holes' edge to edge (for example, about 7.5 mm, or in a range from 1 mm-10 mm, or any other size suitable for the end use), and a second group of holes 502 with a second diameter 520 (for example, about 0.5 mm, or in a range from 0.5 mm-5 mm, or any other size suitable for the end use) being evenly distributed between the holes of the first group of holes 501. The seam shown in FIG. 5 may be formed by a wheel assembly in accordance with the present invention having a first rotatable wheel comprising a first plurality of spikes and a second plurality of spikes, the first and second plurality of spikes having different shapes and sizes, and a second rotatable wheel with a first plurality of holes and a second plurality of holes being sized and positioned to receive the first and second plurality of spikes from the first rotatable wheel.

The holes made on fabric assemblies by the welding and cutting wheels in accordance with the present invention may form many different patterns with holes of different sizes. FIG. 6, for example, shows another example of how the holes may be arranged, where three rows of holes of equal size are used. As seen in FIG. 6, holes 610 may be presented in a first row, holes 620 may be presented on a second row and may be offset by a predetermined distance from the holes 610 in the first row, and holes 630 may be presented on a third row, aligned with the holes 610 in the first row. Further, in the example of FIG. 6, the offset is only presented for the second row, but an offset may be applied to none of the rows, one row (as shown), two rows, three rows, etc. Further, the offset may be of any size, such as, for example, 0 mm (no offset), 1 mm, 2 mm, 3 mm, etc., or any other size in between, according to the particular pattern desired. The holes in this example are of uniform size, but holes may be of different sizes. Additionally, there are three rows of holes presented in this particular example, but the number of rows may also vary according to the size of the holes, the pattern desired and the thickness of the seam on which the holes may be punctured.

FIG. 7 is a cross-sectional view of one of the spikes used on the first or male rotatable wheel of the welding and cutting wheel assembly shown in FIG. 1, FIG. 2 and FIG. 4 in accordance with the present invention. As presented in FIG. 7, spike 700 may have a flat bottom cone shape. More specifically, spike 700 may have a first diameter 710 where the spike is connected to the first or male rotatable wheel and a second smaller diameter 720 at the end of the flat bottom cone shape.

Figure 8:
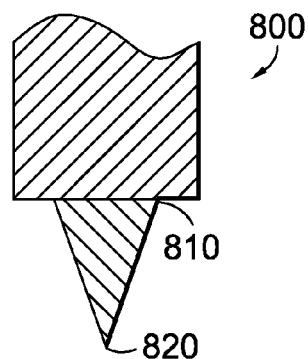
FIG. 8 is a cross-section of an exemplary sharp cone spike of the cutting and welding wheel in accordance with the present invention.

FIG. 8 is a cross-sectional view of a different exemplary spike that may be used on the first or male rotatable wheel of the welding and cutting wheel in accordance with the present invention. As it can be seen in FIG. 8, spike 800 may have a pointed cone shape. More specifically, spike 800 may be shaped such that the first diameter 810 where the spike is connected to the first or male rotatable wheel becomes decreasingly smaller along the length of the spike to the end, where the second diameter 820 may be no bigger than a single point.

Figure 9:
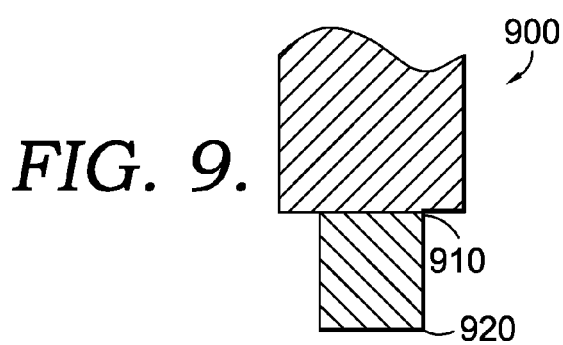
FIG. 9 is a cross-section of a further exemplary cylindrical spike of the cutting and welding wheel in accordance with the present invention.

FIG. 9 is a cross-sectional view of another exemplary spike to be used on the first or male rotatable wheel of the welding and cutting wheel assembly in accordance with the present invention. As further shown in FIG. 9, spike 900 may have a cylindrical shape with a first diameter 910 where the spike is connected to the first or male rotatable wheel of the wheel assembly in accordance with the present invention, be equal to a second diameter 920 where the spike ends.

Figure 10:
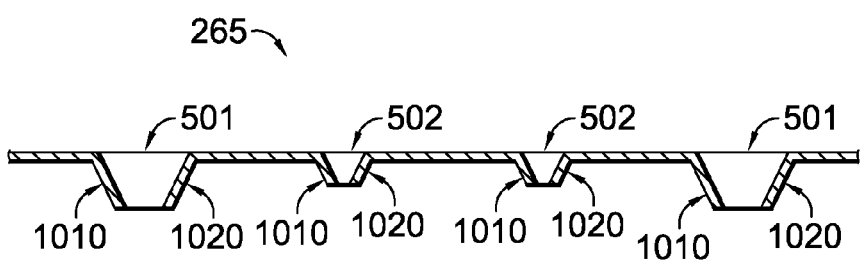
FIG. 10 is a cross-sectional view of a fabric and adhesive assembly cut and welded with the cone spikes presented in FIG. 6 and FIG. 7 with residual fabric tapering inward after the holes are cut.

If the spikes on the first or male rotatable wheel have the cone shape of either FIG. 7 or FIG. 8, the holes produced on a fabric and adhesive assembly may have some fabric tapering inward as the spikes push down on the fabric assembly to make a hole. FIG. 10 is a cross-sectional view of a welded and cut fabric and adhesive assembly 265 of FIG. 5, that was cut and welded with a first or male rotatable wheel having the cone shaped spikes presented in either FIG. 7 or FIG. 8. Holes 501 and 502 have some fabric all around each hole tapering inward, shown with the numbers 1010 and 1020 in FIG. 10.

Figure 11:
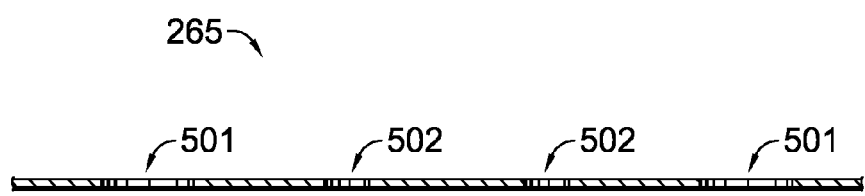
FIG. 11 is a cross-sectional view of a fabric and adhesive assembly cut and welded with the cylindrical spikes presented in FIG. 8 with no residual fabric tapering inward after the holes are cut.

The cylindrical shaped spike shown in FIG. 9 may function similar to a paper hole puncher, where clean holes are punched straight through. In other words, if the spikes have a cylindrical shape such as the one shown in FIG. 9, the holes punctured on the fabric assembly may be clean holes, meaning without any residual fabric tapering inward like when the spikes shown in FIG. 7 or FIG. 8 would produce. This will be understood better in reference to FIG. 11, which is a cross-sectional view of a fabric assembly 265 welded and cut with cylindrical spikes. The holes 501 and 502 in this case, may not have fabric tapering inward because the spike may be able to puncture the hole cleanly applying pressure evenly throughout its whole circumference.

Figure 12:
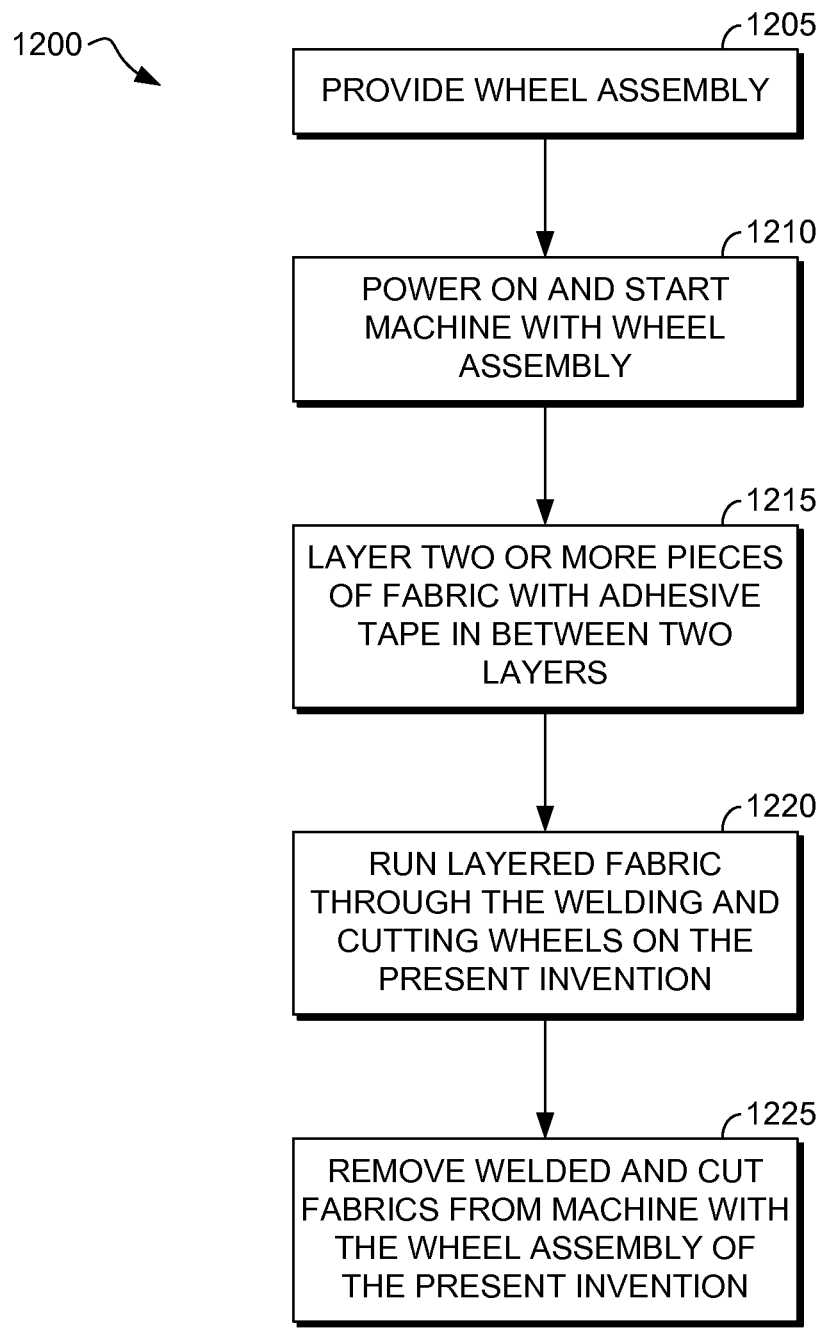
FIG. 12 is a flow chart of an example method of bonding and cutting fabric in accordance with the present invention.

FIG. 12 illustrates a method 1200 of forming welded and perforated seams in accordance with the present invention. In step 1205 a cutting and welding wheel assembly is provided, such as the example assemblies described herein. The user may set the wheel assembly of the present invention in motion by switching the power on to start the machine in step 1210. Then, the user may place a fabric assembly, or any other sheet-type material, comprising at least two layers of fabric, or sheet-type material, with a layer of adhesive material sandwiched in between the at least two layers of fabric, or sheet-type material, in step 1215 for example as illustrated in FIG. 2 and FIG. 4. The region to be joined on each of the at least two layers of fabric, or sheet-type material, may be aligned such that the at least two layers of sheet-type material extend in a substantially parallel manner, at least in the aligned region to be joined. Referring back to FIG. 2 and FIG. 4, where an example of a fabric assembly 265 with its components: a first layer of fabric 215, a layer of adhesive material 220 and a second layer of fabric 225 may be seen. The assembled fabric assembly 265 may be moved through and in between the first rotatable wheel and the second rotatable wheel of the cutting and welding wheel assembly in accordance with the present invention in step 1220. Also in step 1220 the adhesive tape may be activated by applying some form of energy suitable for the particular type of adhesive material. Further in step 1220, beginning the seam at one end of the fabric assembly 265, as the fabric assembly 265 is gradually moved along in between the first and second cutting and welding wheels either manually or mechanically, the wheels may gradually apply a compressive force to the region to be joined, the compressive force being applied substantially perpendicular to the fabric assembly 265. The compressive force may be exerted by the opposing faces with the mating protrusions and indentations on the welding and cutting wheels. Through this compressive force, the components of the fabric assembly 265 may be pushed together so that the cutting and welding of the fabric assembly 265 happens as the wheels rotate, at a portion of the fabric assembly that is less than the whole fabric assembly 265 just at the area 240, where the two wheels mate. This process may be repeated until the whole seam is completed through the other end of the fabric assembly 265. Finally, the user may remove the welded and cut fabric assembly product in step 1225 and proceed to other steps for fabricating the desired article of manufacture.

Figure 13:
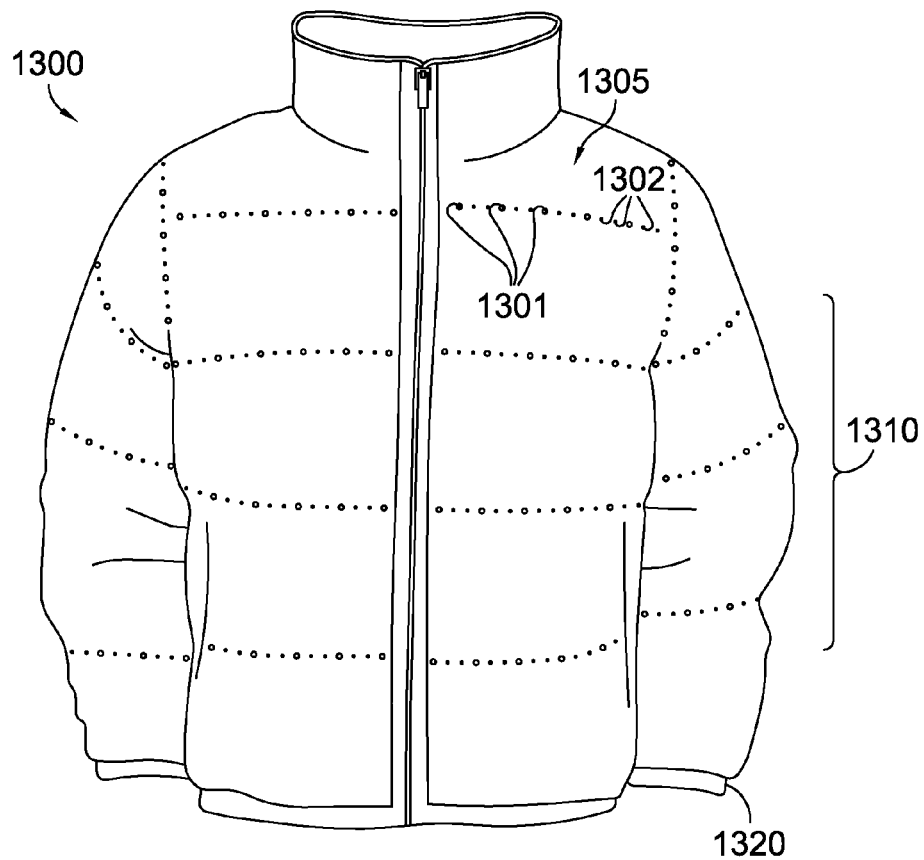
FIG. 13 is a perspective view of an example garment made by bonding and cutting fabric in accordance with the present invention.

In FIG. 13, a garment having seams 1305 with a first group of holes 1301 and a second group of holes 1302 made with the wheel assembly of the present invention are shown. In this example, the seams 1305 are on the outside and therefore exposed in the final product, a down filled coat 1300. Further, it can be seen from the coat 1300 that seams made in accordance with the present invention can be placed in the middle of a garment 1310 or on the edges or "hems" of the garment (not shown.) This garment is shown only by way of example, as the present invention may be used to make other types of garments such as vests, hats, pants, bodysuits, overalls, etc. In addition, thermal filling materials such as thermally insulating synthetic fibers may be used in combination or instead of down.

The garments, such as the one shown in FIG. 13, produced with the wheel assembly in accordance with the present invention may be standalone garments, or the garments may be used as thermal liners in combination with an outer shell garment. If the garments are used as thermal liners, they may or may not be made removable. If the thermal liners are made removable, they may be fastened to the outer shell garments with fasteners such as for example buttons, zippers, hook and loop fasteners, or any other type of fastener. A thermal liner may also be used as a standalone garment. In addition, if the thermal liner, for example in the case of a jacket, is provided with sleeves, the sleeves may be optionally made removable so that a wearer may be able to adjust the level of insulation desired. In the case of pants, the legs may be made completely or partially removable, or both, etc.

Figure 14:
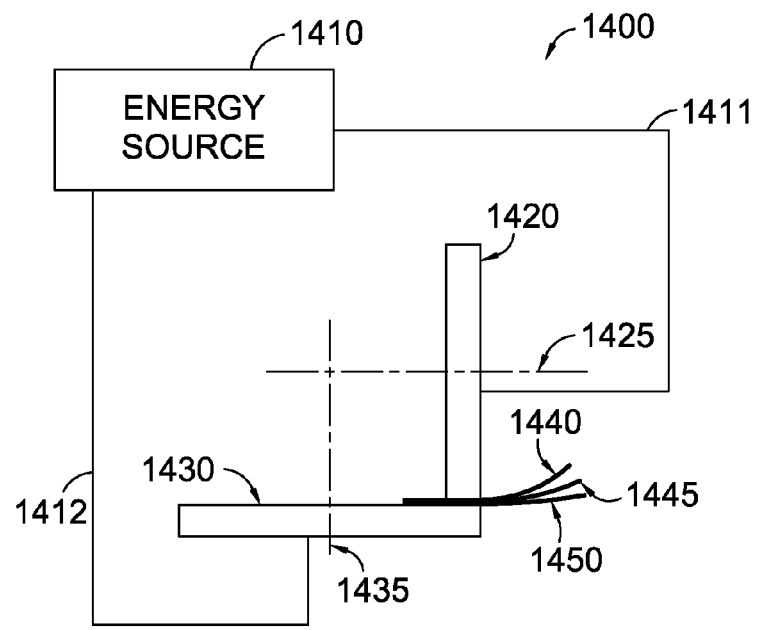
FIG. 14 is a schematic example showing a first wheel and/or a second wheel operably coupled to an energy source in accordance with the present invention.

FIG. 14 is a schematic depiction of a wheel assembly 1400 of the present invention. Wheel assembly 1400 may be operably coupled to an energy source 1410. The energy source 1410 may be operably coupled to the first rotatable wheel 1420 configured to rotate around a first axis 1425 by suitable connections 1411, and/or the energy source may be operably coupled to the second rotatable wheel 1430 configured to rotate around a second axis 1435 by suitable connections 1412. Connections 1411, 1412 may be of any type that transmits the desired type of energy from the energy source to the desired wheel. As shown in FIG. 14, a first fabric 1440 is permanently welded to a second fabric 1450 by activating the adhesive 1445 and cut, as the fabric assembly passes through the wheel assembly of the present invention.

Holes on fabric assemblies made by the wheel assembly of the present invention may be arranged to form different patterns, especially for seams used on the outside, creating added visual effects. Hence, the wheel assembly of the present invention may be used to make welded fabric assemblies with multiple holes with many different shapes and sizes that may not necessarily be linearly arranged. The seams made by the wheel assembly of the present invention may be used to form hems to create internal and/or external pockets, to form spaces for insulation in garments, to join abutting ends of fabric pieces, or in any other instance requiring the joining of two or more fabrics. The holes on fabric/textile assemblies made by the wheel assembly of the present invention may be arranged to appear continuously along the seams (as shown), or more intermittently (not shown), depending on the level of ventilation and breathability performance desired for the particular garment. Alternatively, the holes may be placed strategically throughout the garment only in the places that may align with the areas in a wearer's body where the level of perspiration may be higher, such as under the arms, a wearer's back, etc.

Figure 15:
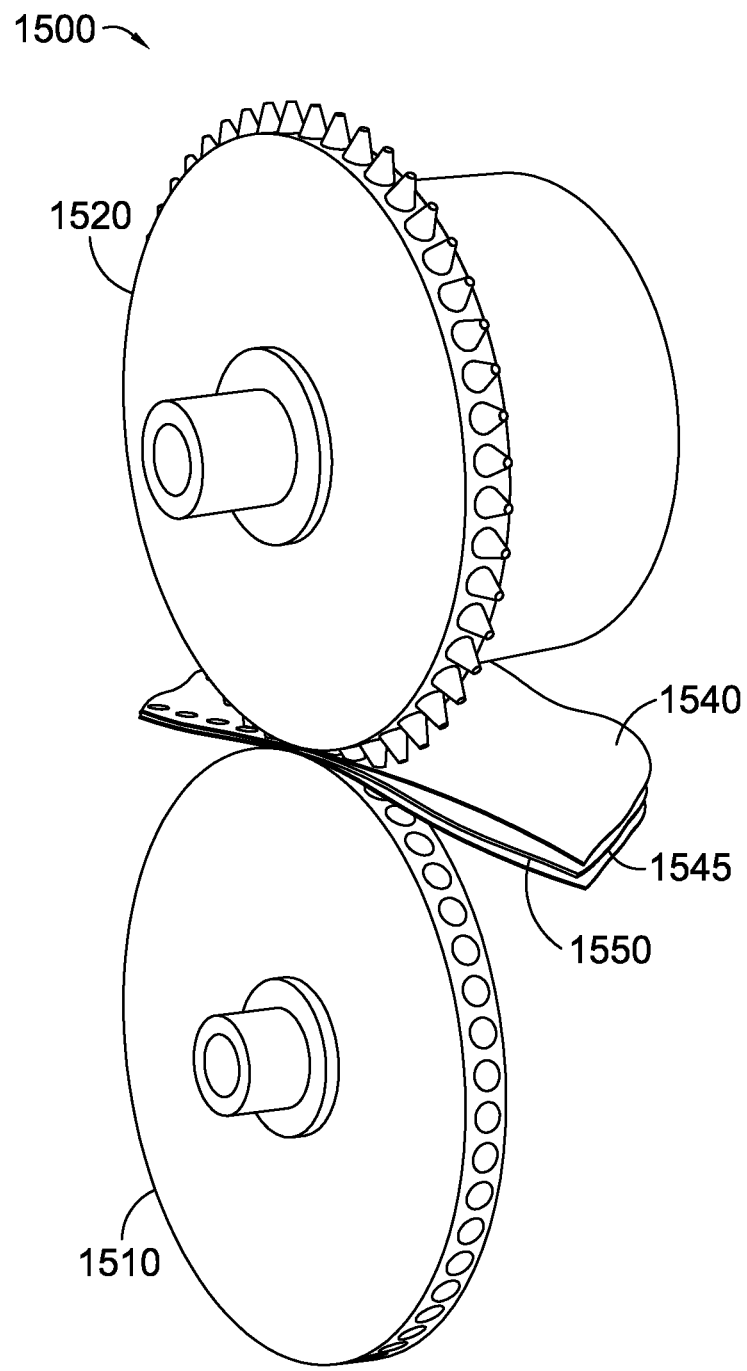
FIG. 15 is an illustration of an exemplary welding an cutting wheel assembly in accordance with the present invention, where the wheels are such that the spikes along the perimeter of a first wheel are set up to mate with the holes along the perimeter of a second wheel as they are rotated.
Figure 16:
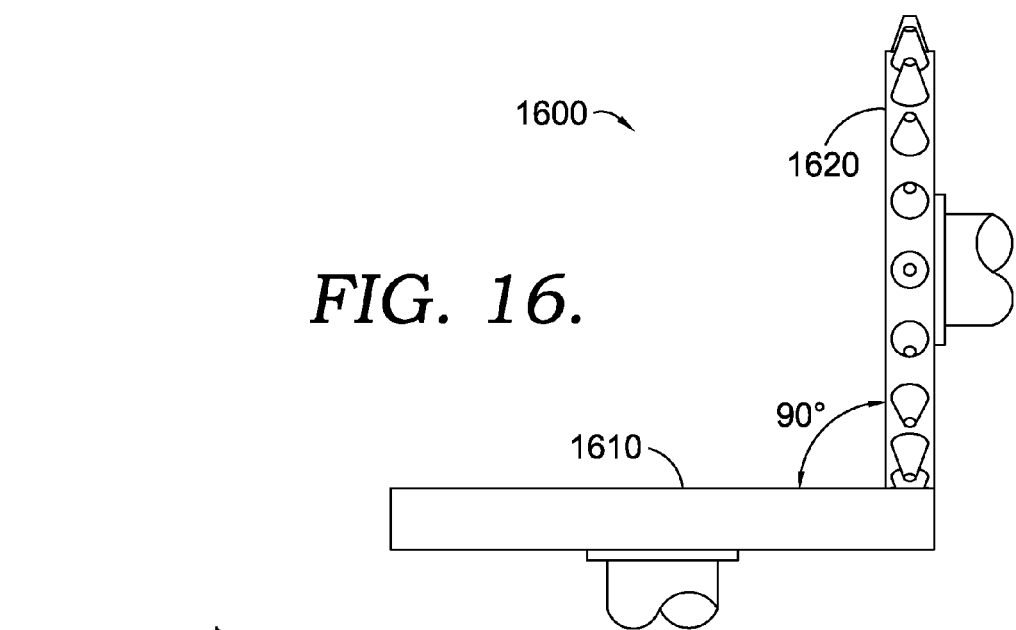
FIG. 16 is an illustration of a welding and cutting wheel assembly in accordance with the present invention with a female rotatable wheel that may rotate around a first axis and a male rotatable wheel that may rotate around a second axis, the second axis being oriented at a right angle from the first axis.
Figure 17:
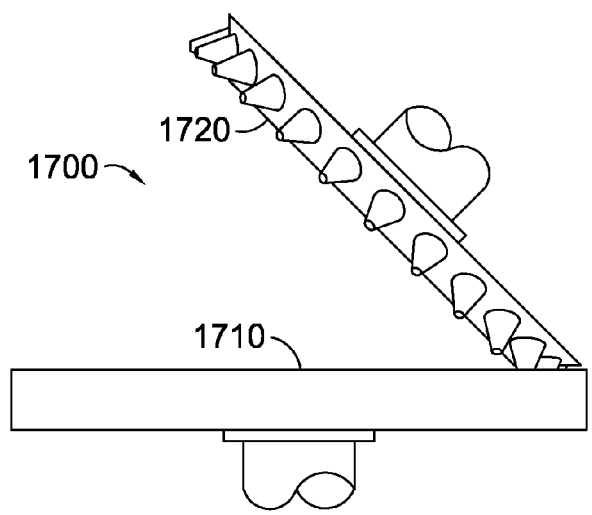
FIG. 17 is an illustration of a welding and cutting wheel assembly in accordance with the present invention with a female rotatable wheel that may rotate around a first axis and a male rotatable wheel that may rotate around a second axis, the second axis being oriented at an acute angle from the first axis.
Figure 18:
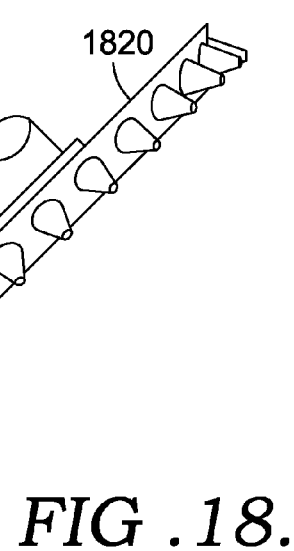
FIG. 18 is an illustration of a welding and cutting wheel assembly in accordance with the present invention with a female rotatable wheel that may rotate around a first axis and a male rotatable wheel that may rotate around a second axis, the second axis being oriented at an obtuse angle from the first axis.

FIGS. 15-18 illustrate several examples of the welding and cutting wheel assembly in accordance with the present invention. FIG. 15 is an illustration of an exemplary welding and cutting wheel assembly 1500 in accordance with the present invention, where the first rotatable male wheel 1520 may have spikes along its perimeter, and the second rotatable female wheel 1510 may have holes along its perimeter, arranged to receive the spikes from the first rotatable male wheel. When the wheel assembly is in use, a fabric assembly comprising two layers of fabric 1540 and 1550 with an adhesive layer 1545 sandwiched in between may be permanently welded and cut as shown. FIG. 16 is an illustration of a welding and cutting wheel assembly 1600 in accordance with the present invention with a female rotatable wheel 1610 that may rotate around a first axis and a male rotatable wheel 1620 that may rotate around a second axis, the second axis being oriented at a right angle from the first axis. FIG. 17 is an illustration of a welding and cutting wheel assembly 1700 in accordance with the present invention with a female rotatable wheel 1710 that may rotate around a first axis and a male rotatable wheel 1720 that may rotate around a second axis, the second axis being oriented at an acute angle from the first axis, where the acute angle may be any angle that is less than 90°. Finally, FIG. 18 is an illustration of a welding and cutting wheel assembly 1800 in accordance with the present invention with a female rotatable wheel 1810 that may rotate around a first axis and a male rotatable wheel 1820 that may rotate around a second axis, the second axis being oriented at an obtuse angle from the first axis, where the obtuse angle may be any angle that is greater than 90°. The present invention is not limited to any single angle between the first axis and the second axis, and FIGS. 15-18 merely illustrate examples of possible configurations.

The present invention has been described in relation to particular examples, which are intended in all respects to be illustrative rather than restrictive. Alternative uses may be made of the present invention without departing from its scope.

From the foregoing, it will be seen that this invention is one well adapted to attain all the ends and objects set forth above, together with other advantages which are obvious and inherent to the system and method. It will be understood that certain features and sub combination are of utility and may be employed without reference to other features and sub combinations. This is contemplated by and is within the scope of the claims.

The invention claimed is:

1. A welding and cutting wheel assembly that simultaneously, permanently joins a plurality of pieces of fabric and precision forms holes in the joined plurality of pieces of fabric by a mating action, the wheel assembly comprising:
   a first rotatable wheel positioned to rotate around a first axis, the first rotatable wheel comprising a first perimeter and a first planar face, the first perimeter being equipped with a first plurality of spikes along the first perimeter of the first rotatable wheel;
   a second rotatable wheel positioned to rotate around a second axis, the second axis being at an angle from the first axis, the second rotatable wheel comprising a second perimeter and a second planar face, the second planar face being equipped with a first plurality of holes on the second planar face of the second rotatable wheel, wherein the first plurality of holes on the second planar face of the second rotatable wheel are aligned to receive the first plurality of spikes of the first perimeter of the first rotatable wheel as the wheels are rotated; and
   an energy source operably connected to at least one of the first rotatable wheel or the second rotatable wheel, such that energy may be transferred from the energy source to at least one of the first rotatable wheel or second rotatable wheel and then to the plurality of pieces of fabric simultaneously joining and forming holes in the plurality of pieces of fabric as the plurality of pieces of fabric are moved through and in between the first rotatable wheel and the second rotatable wheel.

2. The welding and cutting wheel assembly of claim 1, wherein:
   the first rotatable wheel further comprises a second plurality of holes along the first perimeter of the first rotatable wheel; and
   the second rotatable wheel further comprises a second plurality of spikes on the second planar face of the second rotatable wheel, wherein the second plurality of spikes are received by the second plurality of holes as the wheels are rotated.

3. The wheel assembly of claim 2, wherein the energy source comprises a heat source.

4. The wheel assembly of claim 2, wherein the energy source comprises an ultrasonic source.

5. A welding and cutting wheel assembly that simultaneously and permanently joins and forms holes through two or more pieces of fabric by a mating action, the wheel assembly comprising:
   a first rotatable male wheel positioned to rotate around a first axis, the first rotatable male wheel comprising a first perimeter and a first planar face, the first perimeter being equipped with a first plurality of spikes along the first perimeter of the first rotatable male wheel;

a second rotatable female wheel comprising a second perimeter and a second planar face, the second rotatable female wheel positioned to rotate around a second axis, the second axis being at an angle from the first axis of the first rotatable male wheel and equipped with a first plurality of holes on the second planar face of the second rotatable female wheel, the first plurality of holes from the second rotatable female wheel being placed to receive the first plurality of spikes from the first rotatable male wheel as the wheels are rotated; and a heat source operably connected to at least one of the first rotatable male wheel and the second rotatable female wheel, such that heat is transferred from the heat source through at least one of the first rotatable male wheel or the second rotatable female wheel and then to the two or more pieces of fabric, as the two or more pieces of fabric are moved between the first rotatable male wheel and the second rotatable female wheel to simultaneously join and cut holes through the two or more pieces of fabric.

6. The wheel assembly of claim 5, wherein the heat source is operably connected to both the first rotatable male wheel and the second rotatable female wheel.

7. The wheel assembly of claim 5, further comprising an automatic adhesive tape delivery system that inserts a heat activatable adhesive tape between the two or more pieces of fabric as the two or more pieces of fabric pass between the first rotatable male wheel and the second rotatable female wheel.

8. The wheel assembly of claim 5, wherein the second axis of the second rotatable female wheel is positioned at a 90 degree angle from the first axis of the first rotatable male wheel.

9. The wheel assembly of claim 5, wherein the first plurality of spikes from the first rotatable male wheel and the first plurality of holes from the second rotatable female wheel comprise more than one shape.

10. The wheel assembly of claim 5, wherein the first plurality of spikes of the first rotatable male wheel and the first plurality of holes of the second rotatable female wheel cut holes having a diameter in a range from 0.5 mm to 5.0 mm on the two or more pieces of fabric.

11. The wheel assembly of claim 5, wherein the first plurality of spikes of the first rotatable male wheel and the first plurality of holes of the second rotatable female wheel cut holes having a diameter in a range from 0.5 mm to 2.0 mm on the two or more pieces of fabric.

12. The wheel assembly of claim 10, wherein the first plurality of spikes of the first rotatable male wheel and the first plurality of holes of the second rotatable female wheel cut holes that are in a range from 1 mm to 10 mm apart on the two or more pieces of fabric.

13. The wheel assembly of claim 5, wherein:

the first rotatable male wheel further comprises a second plurality of spikes along the first perimeter of the first rotatable male wheel, the second plurality of spikes having a different size than the first plurality of spikes; and the second rotatable female wheel further comprises a second plurality of holes on the second planar face of the second rotatable female wheel, the second plurality of holes being positioned to receive the second plurality of spikes as the wheels are rotated.

14. The wheel assembly of claim 13, wherein the first and second plurality of spikes of the first rotatable male wheel and the first and second plurality of holes of the second rotatable female wheel cut at least one pair of holes, each hole in the at least one pair of holes having a diameter of 2 mm and being 7.5 mm apart; and simultaneously cut at least one hole having a diameter of 0.5 mm, evenly spaced in between the each hole in the at least one pair of holes having a diameter of 2 mm on the two or more pieces of fabric.

15. The wheel assembly of claim 5, wherein:

the first rotatable male wheel further comprises a second plurality of spikes along the first perimeter of the first rotatable male wheel, the second plurality of spikes having a different shape than the first plurality of spikes; and the second rotatable female wheel further comprises a second plurality of holes on the second planar face of the second rotatable female wheel, the second plurality of holes being positioned to receive the second plurality of spikes as the wheels are rotated.

16. The wheel assembly of claim 5, wherein the first rotatable male wheel is equipped with multiple rows of the first plurality of spikes along the first perimeter, and the second rotatable female wheel is equipped with multiple rows of the first plurality of holes to precisely receive the multiple rows of the first plurality of spikes from the first rotatable male wheel.

17. The wheel assembly of claim 5, wherein the first plurality of spikes from the first rotatable male wheel and the first plurality of holes from the second rotatable female wheel cut holes in the two or more fabric pieces that create a pattern.

18. A welding and cutting wheel assembly that simultaneously permanently joins and forms holes through two or more pieces of fabric by a mating action, the wheel assembly comprising:

a first rotatable male wheel positioned to rotate around a first axis, the first rotatable male wheel comprising a first perimeter and a first planar face, the first perimeter being equipped with a first plurality of spikes along the first perimeter of the first rotatable male wheel;

a second rotatable female wheel comprising a second perimeter and a second planar face, the second planar face positioned to rotate around a second axis, the second axis being perpendicular to the first axis of the first rotatable male wheel and equipped with a first plurality of holes on the second planar face of the second rotatable female wheel, the first plurality of holes from the second rotatable female wheel being placed to receive the first plurality of spikes from the first rotatable male wheel as the wheels are rotated; and a heat source operably connected to at least one of the rotatable wheels, such that heat is transferred from the heat source through at least one of the rotatable wheels and then to the two or more pieces of fabric as the two or more pieces of fabric are passed between the first rotatable male wheel and the second rotatable female wheel to simultaneously join and cut holes through the two or more pieces of fabric.

19. A method of forming welded and perforated seams between at least two layers of sheet-type material, the method comprising;

aligning a region to be joined on each of the at least two layers of sheet-type material with an energy activatable adhesive layer laid in between the at least two layers of sheet type material, such that the at least two layers of sheet-type material extend in a substantially parallel manner at least in the aligned region to be joined;

applying energy to the region to be joined to activate the energy activatable adhesive layer in the aligned region to be joined; and applying a compressive force to the aligned region to be joined, the compressive force being applied substantially perpendicular to the at least two layers of sheet-type material by a first rotatable wheel positioned to rotate around a first axis, the first rotatable wheel comprising a first perimeter and a first planar face, the first perimeter being equipped with a first plurality of spikes along the first perimeter of the first rotatable wheel, and a second rotatable wheel positioned to rotate around a second axis, the second axis being at an angle from the first axis, the second rotatable wheel comprising a second perimeter and a second planar face, the second planar face being equipped with a first plurality of holes on the second planar face of the second rotatable wheel, wherein the first plurality of holes on the second planar face of the second rotatable wheel are aligned to receive the first plurality of spikes of the first perimeter of the first rotatable wheel as the wheels are rotated, thereby simultaneously and permanently joining and cutting holes through the aligned region to be joined in the at least two layers of sheet type material by a mating action of the first rotatable wheel and the second rotatable wheel.

20. The method of claim 19, wherein the adhesive activating energy source comprises a heat source.

21. The method of claim 19, wherein the adhesive activating energy source comprises an ultrasonic source.

22. The method of claim 19, wherein the first rotatable wheel further comprises a second plurality of spikes evenly distributed between the first plurality of spikes of the first rotatable wheel, and wherein the second rotatable wheel further comprises a second plurality of holes evenly distributed between the first plurality of holes of the second rotatable wheel, wherein the first plurality of spikes of the first rotatable wheel cut holes having a first diameter, on the aligned region to be joined in the at least two layers of sheet type material, and the second plurality of spikes of the first rotatable cut holes having a second diameter, on the aligned region to be joined in the at least two layers of sheet type material, wherein the first diameter is different from the second diameter.

* * * * *